United States Patent
Yamasaki et al.

(10) Patent No.: US 10,239,968 B2
(45) Date of Patent: Mar. 26, 2019

(54) PRESSURE-SENSITIVE ADHESIVE SHEET FOR COVERING

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Shinya Nishikawa, Osaka (JP); Yasutaka Emoto, Osaka (JP); Kazuto Shiina, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 4 days.

(21) Appl. No.: 15/520,483

(22) PCT Filed: Jun. 2, 2016

(86) PCT No.: PCT/JP2016/066374
§ 371 (c)(1),
(2) Date: Apr. 20, 2017

(87) PCT Pub. No.: WO2017/038180
PCT Pub. Date: Mar. 9, 2017

(65) Prior Publication Data
US 2017/0306063 A1    Oct. 26, 2017

(30) Foreign Application Priority Data
Aug. 28, 2015 (JP) ................. 2015-169202

(51) Int. Cl.
| | | |
|---|---|---|
| *C08F 36/04* | (2006.01) | |
| *C09J 121/00* | (2006.01) | |
| *C01F 5/14* | (2006.01) | |
| *C01F 7/02* | (2006.01) | |
| *C01F 11/18* | (2006.01) | |
| *C09J 7/10* | (2018.01) | |
| *C08K 3/04* | (2006.01) | |
| *C08K 3/013* | (2018.01) | |

(52) U.S. Cl.
CPC ............... *C08F 36/04* (2013.01); *C01F 5/14* (2013.01); *C01F 7/02* (2013.01); *C01F 11/18* (2013.01); *C09J 7/10* (2018.01); *C09J 121/00* (2013.01); *C01P 2004/62* (2013.01); *C01P 2006/12* (2013.01); *C08K 3/013* (2018.01); *C08K 3/04* (2013.01); *C09J 2201/606* (2013.01); *C09J 2203/302* (2013.01); *C09J 2205/102* (2013.01); *C09J 2421/00* (2013.01)

(58) Field of Classification Search
CPC .... C08F 36/04; C01F 5/14; C01F 7/02; C01F 11/18
USPC .......................................... 524/575
See application file for complete search history.

(56) References Cited

U.S. PATENT DOCUMENTS

2015/0299524 A1* 10/2015 Nishijima .............. C09J 123/22
428/41.3

FOREIGN PATENT DOCUMENTS

| CN | 103614100 B | | 6/2015 |
|---|---|---|---|
| JP | 2007002886 A | * | 1/2007 |
| JP | 2010-047687 A | | 3/2010 |
| JP | 2010047687 A | * | 3/2010 |
| JP | 4920400 B2 | | 4/2012 |

* cited by examiner

*Primary Examiner* — Kelechi C Egwim
(74) *Attorney, Agent, or Firm* — Drinker Biddle & Reath LLP

(57) ABSTRACT

A pressure-sensitive adhesive sheet for covering according to an embodiment of the present invention includes a non-crosslinked rubber component having a maximum peak of the molecular weight distribution in the range of 50,000 to 3,000,000, an oil component having a maximum peak of the molecular weight distribution in the range of 1,000 to 20,000, and carbon black. The content of the non-crosslinked rubber component is 25% to 65% by mass, the content of the oil component is 35% to 75% by mass, and the content of the carbon black relative to 100 parts by mass of the total of the non-crosslinked rubber component and the oil component is 1 to 40 parts by mass.

6 Claims, No Drawings

PRESSURE-SENSITIVE ADHESIVE SHEET FOR COVERING

TECHNICAL FIELD

The present invention relates to a pressure-sensitive adhesive sheet for covering.

BACKGROUND ART

In an electrical wire bundled portion in which conductors of electrical wires are tied together, for example, a hot-melt resin or the like is used to waterproof and protect the electrical wires. However, there is a concern that the hot-melt resin may melt again when heated to a high temperature, causing slippage to occur in the hot-melt resin.

Accordingly, a pressure-sensitive adhesive sheet for waterproofness and airtightness has been proposed to make up for the drawback of the hot-melt resin (e.g., Japanese Patent No. 4920400). The pressure-sensitive adhesive sheet is composed of a crosslinked solid-type tackifier composition including (a) a rubbery polymer, (b) a tackifier, and (c) a crosslinking agent.

CITATION LIST

Patent Literature

PTL 1: Japanese Patent No. 4920400

SUMMARY OF INVENTION

Technical Problem

The pressure-sensitive adhesive sheet described above needs to be wrapped in many layers around an electrical wire bundled portion. Since the rubbery polymer contained in the pressure-sensitive adhesive sheet is crosslinked, the tensile strength of the pressure-sensitive adhesive sheet is relatively high, which may relatively increase the load on the operator who uses the pressure-sensitive adhesive sheet. Furthermore, since the rubbery polymer is crosslinked as described above, the tensile elongation of the pressure-sensitive adhesive sheet is small, and there is a concern that the pressure-sensitive adhesive sheet may break during the operation of wrapping the pressure-sensitive adhesive sheet. Furthermore, since the rubbery polymer is softened by heat, the pressure-sensitive adhesive sheet may slip under its own weight at high temperatures. Moreover, since the rubber component is likely to deteriorate when subjected to a high-temperature environment, there is a concern that the pressure-sensitive adhesive sheet may peel off the adherend.

The present invention has been accomplished under these circumstances, and it is an object of the present invention to provide a pressure-sensitive adhesive sheet for covering in which tensile strength is relatively low, tensile elongation is relatively large, slippage and deterioration due to high temperature can be suppressed, and excellent adhesiveness is exhibited.

Solution to Problem

A pressure-sensitive adhesive sheet for covering according to an embodiment of the present invention, which has been achieved in order to solve the problem described above, includes a non-crosslinked rubber component having a maximum peak of the molecular weight distribution in the range of 50,000 to 3,000,000, an oil component having a maximum peak of the molecular weight distribution in the range of 1,000 to 20,000, and carbon black. The content of the non-crosslinked rubber component is 25% to 65% by mass, the content of the oil component is 35% to 75% by mass, and the content of the carbon black relative to 100 parts by mass of the total of the non-crosslinked rubber component and the oil component is 1 to 40 parts by mass.

Advantageous Effects of Invention

In the pressure-sensitive adhesive sheet for covering according to the embodiment of the present invention, tensile strength is relatively low, tensile elongation is relatively large, slippage and deterioration due to high temperature can be suppressed, and excellent adhesiveness is exhibited.

DESCRIPTION OF EMBODIMENTS

Description of Embodiments of the Present Invention

A pressure-sensitive adhesive sheet for covering according to an embodiment of the present invention includes a non-crosslinked rubber component having a maximum peak of the molecular weight distribution in the range of 50,000 to 3,000,000, an oil component having a maximum peak of the molecular weight distribution in the range of 1,000 to 20,000, and carbon black. The content of the non-crosslinked rubber component is 25% to 65% by mass, the content of the oil component is 35% to 75% by mass, and the content of the carbon black relative to 100 parts by mass of the total of the non-crosslinked rubber component and the oil component is 1 to 40 parts by mass.

Since the pressure-sensitive adhesive sheet for covering includes the rubber component that is not crosslinked, elongation is maintained. Furthermore, by setting the contents of the non-crosslinked rubber component, the oil component, and the carbon black to be predetermined values, it is possible to obtain relatively low tensile strength and relatively large tensile elongation. Furthermore, in the pressure-sensitive adhesive sheet for covering, by setting the content of the carbon black to be a predetermined value, it is possible to suppress slippage and deterioration due to high temperature. Furthermore, in the pressure-sensitive adhesive sheet for covering, by setting the content of the non-crosslinked rubber component to be in a predetermined range, i.e., by setting the content of the oil component to be in a predetermined range, and by adjusting the maximum peak of the molecular weight distribution of each of the non-crosslinked rubber component and the oil component, it is possible to suppress slippage due to high temperature, and it is possible to relatively increase peel strength.

Accordingly, in the pressure-sensitive adhesive sheet for covering, tensile strength is relatively low, tensile elongation is relatively large, slippage and deterioration due to high temperature can be suppressed, and excellent adhesiveness is exhibited.

The term "maximum peak of the molecular weight distribution" means the peak position at which the number of molecules is maximum in a molecular weight distribution in which the horizontal axis represents the molecular weight and the vertical axis represents the number of molecules having the molecular weight. Here, the molecular weight at the maximum peak position corresponds to the number average molecular weight. When there is one local maximum peak in the molecular weight distribution, the peak position corresponds to the "maximum peak of the molecular weight distribution". When the molecular weight distribution includes a plurality of local maximum peaks, the peak position having the largest number of molecules among the local maximum peaks is defined as the "maximum peak of the molecular weight distribution". Here, the molecular weight distribution can be obtained by gel permeation chromatography. In some cases, the "maximum peak of the molecular weight distribution" may also be referred to as the "molecular weight maximum peak".

The pressure-sensitive adhesive sheet for covering may preferably further include an inorganic filler other than the carbon black, and the content of the inorganic filler relative to 100 parts by mass of the total of the non-crosslinked rubber component and the oil component is preferably more than 0 parts by mass and 200 parts by mass or less. By further incorporating the inorganic filler other than the carbon black and setting the content of the inorganic filler relative to 100 parts by mass of the total of the non-crosslinked rubber component and the oil component to be more than 0 parts by mass and 200 parts by mass or less, the slippage suppression effect of the pressure-sensitive adhesive sheet for covering at high temperatures can be promoted.

The inorganic filler may be at least one selected from the group consisting of calcium carbonate, talc, clay, aluminum hydroxide, and magnesium hydroxide. By using the above as the inorganic filler, the slippage suppression effect of the pressure-sensitive adhesive sheet for covering at high temperatures can be further promoted, and it is possible to easily make fine adjustments to the hardness and hand feeling of the pressure-sensitive adhesive sheet for covering. Furthermore, by adding the inorganic filler to the pressure-sensitive adhesive sheet for covering, it is possible to reduce the amounts used of the non-crosslinked rubber component and the oil component which are more expensive, and cost reduction can be achieved.

The pressure-sensitive adhesive sheet for covering may preferably further include a tackifier having a softening point of 50° C. to 150° C. and a molecular weight of 100 to 1,300, and the content of the tackifier relative to 100 parts by mass of the total of the non-crosslinked rubber component and the oil component is preferably more than 0 parts by mass and 30 parts by mass or less. By further incorporating a tackifier having a softening point of 50° C. to 150° C. and a molecular weight of 100 to 1,300 and setting the content of the tackifier relative to 100 parts by mass of the total of the non-crosslinked rubber component and the oil component to be more than 0 parts by mass and 30 parts by mass or less, it is possible to further improve the peel strength of the pressure-sensitive adhesive sheet for covering and it is possible to promote the adhesion effect thereof.

The carbon black may be at least one selected from the group consisting of furnace black, ketjen black, and acetylene black. By using, as the carbon black, at least one selected from the group consisting of furnace black, ketjen black, and acetylene black, the slippage suppression effect of the pressure-sensitive adhesive sheet for covering can be further promoted.

Preferably, the tensile strength is 0.5 MPa or less, and the tensile elongation is 2,000% or more. The movement in the vertical direction of the pressure-sensitive adhesive sheet for covering after being heated at 130° C. for 7 days on a surface parallel to gravity is preferably 1 mm or less. By setting the tensile strength to be 0.5 MPa or less and the tensile elongation to be 2,000% or more, the operational efficiency of the operator is improved, and the handleability of the pressure-sensitive adhesive sheet for covering is improved. Furthermore, when the movement in the vertical direction is 1 mm or less, it becomes possible to continue to protect an adherend with the pressure-sensitive adhesive sheet for covering for a relatively long period of time.

Detailed Description of Embodiments of the Present Invention

Embodiments of the present invention will be described in detail below.

[Pressure-Sensitive Adhesive Sheet for Covering]

The pressure-sensitive adhesive sheet for covering includes a non-crosslinked rubber component having a maximum peak of the molecular weight distribution in the range of 50,000 to 3,000,000, an oil component having a maximum peak of the molecular weight distribution in the range of 1,000 to 20,000, and carbon black. The content of the non-crosslinked rubber component is 25% to 65% by mass, the content of the oil component is 35% to 75% by mass, and the content of the carbon black relative to 100 parts by mass of the total of the non-crosslinked rubber component and the oil component is 1 to 40 parts by mass. The pressure-sensitive adhesive sheet for covering may include, as optional components, an inorganic filler other than the carbon black, and a tackifier.

Since the pressure-sensitive adhesive sheet for covering includes the rubber component that is not crosslinked, elongation is maintained. Furthermore, by setting the contents of the non-crosslinked rubber component, the oil component, and the carbon black to be predetermined values, it is possible to obtain relatively low tensile strength and relatively large tensile elongation. Furthermore, in the pressure-sensitive adhesive sheet for covering, by setting the content of the carbon black to be a predetermined value, it is possible to suppress slippage and deterioration due to high temperature. Furthermore, in the pressure-sensitive adhesive sheet for covering, by setting the content of the non-crosslinked rubber component to be in a predetermined range, i.e., by setting the content of the oil component to be in a predetermined range, and by adjusting the maximum peak of the molecular weight distribution of each of the non-crosslinked rubber component and the oil component, it is possible to suppress slippage due to high temperature, and it is possible to relatively increase peel strength.

Accordingly, in the pressure-sensitive adhesive sheet for covering, tensile strength is relatively low, tensile elongation is relatively large, slippage and deterioration due to high temperature can be suppressed, and excellent adhesiveness is exhibited. The components included in the pressure-sensitive adhesive sheet for covering will be described in detail below.

(Non-Crosslinked Rubber Component)

The non-crosslinked rubber component has a function of imparting elasticity to the pressure-sensitive adhesive sheet for covering. Since the pressure-sensitive adhesive sheet for covering includes the non-crosslinked rubber component, the pressure-sensitive adhesive sheet for covering has rubbery properties. That is, the pressure-sensitive adhesive sheet for covering has a push-back force against applied stress and can be elongated by stretching.

The pressure-sensitive adhesive sheet for covering includes a rubber component that is not crosslinked (hereinafter, also referred to as the "non-crosslinked rubber component"). For example, in the case where a pressure-sensitive adhesive sheet including a crosslinked rubber component is produced, a crosslinking agent is added to a rubber component, and the resulting mixture is kneaded and then processed into a sheet form. By adding the crosslinking agent to the rubber component, crosslinking of the rubber component proceeds. If a mistake is made in setting the temperature in the kneading step, since the crosslinked rubber component cannot be used again, there is a possibility that all of the products will have to be disposed of. Furthermore, if a mistake is made in setting the processing time in the processing step, all of the products will have to be disposed of as described above. However, when the rubber component is not crosslinked, even if a mistake is made in setting the temperature in the kneading step or the processing time in the processing step, reuse is possible. Furthermore, since a crosslinking step is not required, the number of steps can be decreased, and production costs can be reduced.

Examples of the non-crosslinked rubber component include ethylene propylene rubber (hereinafter, also referred to as "EPR"), butyl rubber, butadiene rubber, isoprene rubber, polyisobutylene rubber, and the like. Among these, EPR, butyl rubber, and polyisobutylene rubber are preferable, and polyisobutylene rubber is particularly preferable. By using polyisobutylene rubber as the non-crosslinked rubber component, the tensile strength of the pressure-sensitive adhesive sheet for covering is relatively decreased, and the operational efficiency of the operator can be improved. Furthermore, two or more of the non-crosslinked rubber components may mixed for use. By using two or more non-crosslinked rubber components, the tensile strength of the pressure-sensitive adhesive sheet for covering can be easily adjusted.

The maximum peak in the molecular weight distribution of the non-crosslinked rubber component is in the range of 50,000 to 3,000,000. The lower limit of the maximum peak in the molecular weight distribution is preferably 65,000, and more preferably 200,000. Furthermore, the upper limit of the maximum peak in the molecular weight distribution is preferably 800,000. In the case where the maximum peak in the molecular weight distribution of the non-crosslinked rubber component is less than the lower limit, there is a concern that the movement in the vertical direction of the pressure-sensitive adhesive sheet for covering may relatively increase and peel strength may decrease. On the other hand, in the case where the maximum peak is more than the upper limit, even if oil is added in an amount in or above the addition range, strength adjustment is difficult, and a phenomenon in which the oil component is precipitated on the surface of the pressure-sensitive adhesive sheet for covering i.e., bleedout is likely to occur.

The content of the non-crosslinked rubber component is 25% to 65% by mass. The lower limit of the content of the non-crosslinked rubber component is preferably 30% by mass, and more preferably 35% by mass. On the other hand, the upper limit of the content is preferably 60% by mass, and more preferably 50% by mass. In the case where the content of the non-crosslinked rubber component is less than the lower limit, there is a concern that the movement in the vertical direction may relatively increase because of excessive softness of the pressure-sensitive adhesive sheet for covering, and there is also a concern that the oil component may be precipitated on the surface of the pressure-sensitive adhesive sheet for covering. Furthermore, in the case where the content of the non-crosslinked rubber component is more than the upper limit, there is a concern that the tensile strength of the pressure-sensitive adhesive sheet for covering may relatively increase, and there is also a concern that the pressure-sensitive adhesive sheet for covering may peel off the adherend. Moreover, there is a concern that the operational efficiency of the user who uses the pressure-sensitive adhesive sheet for covering may decrease.

The lower limit of the density of the non-crosslinked rubber component is preferably 0.70 g/mL, more preferably 0.80 g/mL, and still more preferably 0.85 g/mL. On the other hand, the upper limit of the density is preferably 1.10 g/mL, more preferably 1.00 g/mL, and still more preferably 0.95 g/mL. By setting the density of the non-crosslinked rubber component to be in the range described above, the pressure-sensitive adhesive sheet for covering can have excellent flexibility, and the operational efficiency of the user can be improved.

(Oil Component)

The oil component softens the non-crosslinked rubber component, and by incorporating the oil component into the pressure-sensitive adhesive sheet for covering, it is possible to impart flexibility to the pressure-sensitive adhesive sheet for covering and to control tensile strength.

Any oil component can be used as long as it is compatible with the non-crosslinked rubber component, and examples thereof include mineral oil, polyisobutylene, polybutene, vegetable oil, and the like. As the oil component, polyisobutylene and polybutene are preferable, and polybutene is particularly preferable. By using polybutene as the oil component, the pressure-sensitive adhesive sheet for covering can have relatively high flexibility, and tensile strength can be controlled. Furthermore, two or more of the oil components may be mixed for use. By using two or more oil components, the flexibility of the pressure-sensitive adhesive sheet for covering can be easily adjusted.

The maximum peak in the molecular weight distribution of the oil component is in the range of 1,000 to 20,000. The lower limit of the maximum peak in the molecular weight distribution of the oil component is preferably 1,500, and more preferably 2,000. Furthermore, the upper limit of the maximum peak is preferably 15,000, and more preferably 10,000. In the case where the maximum peak in the molecular weight distribution of the oil component is less than the lower limit of the molecular weight range, there is a concern that the peel strength of the pressure-sensitive adhesive sheet for covering may be relatively decreased, and the rubber component and the oil component may be separated from each other, resulting in leakage of the oil component. On the other hand, in the case where the maximum peak is more than the upper limit of the molecular weight range, since it is not possible to obtain the flexibility of the pressure-sensitive adhesive sheet for covering, tensile strength increases, which may result in a decrease in the operational efficiency of the operator using this.

The content of the oil component is 35% to 75% by mass. The lower limit of the content of the oil component is preferably 40% by mass, and more preferably 45% by mass. On the other hand, the upper limit of the content is preferably 70% by mass, and more preferably 65% by mass. In the case where the content of the oil component is less than the lower limit, there is a concern that the tensile strength of the pressure-sensitive adhesive sheet for covering may relatively increase and that the pressure-sensitive adhesive sheet may peel off the adherend. Moreover, there is a concern that the operational efficiency of the user who uses the pressure-sensitive adhesive sheet for covering may be decreased. Furthermore, in the case where the content is more than the upper limit, there is a concern that the movement in the vertical direction of the pressure-sensitive adhesive sheet for covering may relatively increase and that the oil component may be precipitated on the surface of the pressure-sensitive adhesive sheet for covering.

The lower limit of the density of the oil component is preferably 0.70 g/mL, more preferably 0.75 g/mL, and still more preferably 0.80 g/mL. On the other hand, the upper limit of the density is preferably 1.10 g/mL, more preferably 1.05 g/mL, and still more preferably 1.00 g/mL. By setting the density of the oil component to be in the range described above, the pressure-sensitive adhesive sheet for covering can have excellent flexibility, and the operational efficiency of the user can be improved.

(Carbon Black)

Carbon black is added to the pressure-sensitive adhesive sheet for covering to suppress slippage due to high temperature. Carbon black has good dispersibility in the rubber component and the oil component, and by adding carbon black to the pressure-sensitive adhesive sheet for covering, thixotropic properties are improved. Therefore, it is believed that the movement in the vertical direction can be suppressed when the pressure-sensitive adhesive sheet for covering is placed in the high-temperature environment. Furthermore, in general, silica is known to exhibit thixotropic properties. However, even if silica is added to the pressure-sensitive adhesive sheet for covering, there is a possibility that appropriate tensile strength and tensile elongation cannot be obtained. Accordingly, in the present invention, it is necessary to use carbon black.

Any carbon black that can suppress the slippage of the pressure-sensitive adhesive sheet for covering due to high temperature may be used, and examples thereof include ketjen black, furnace black, acetylene black, and the like. As the carbon black, ketjen black and furnace black are preferable, and furnace black is more preferable. Furnace black contains many particles having a particle size that is able to satisfactorily suppress slippage due to high temperature. Accordingly, by using furnace black as the carbon black, the effect of suppressing slippage due to high temperature can be further improved. Furthermore, since furnace black is inexpensive, it is possible to reduce material costs of the pressure-sensitive adhesive sheet for covering.

The content of the carbon black relative to 100 parts by mass of the total of the non-crosslinked rubber component and the oil component is 1 to 40 parts by mass. The lower limit of the content of the carbon black is preferably 5 parts by mass, and more preferably 8 parts by mass. On the other hand, the upper limit of the content is preferably 35 parts by mass, and more preferably 30 parts by mass. In the case where the content is less than the lower limit, there is a concern that it may become difficult to obtain the effect of suppressing sagging of the pressure-sensitive adhesive sheet for covering at high temperatures. On the other hand, in the case where the content is more than the upper limit, there is a concern that the tensile elongation of the pressure-sensitive adhesive sheet for covering may be markedly decreased, and the electrical conductivity of the pressure-sensitive adhesive sheet for covering is increased, which may cause a short circuit.

The lower limit of the arithmetic average particle diameter of the carbon black is preferably 25 nm, more preferably 30 nm, and still more preferably 35 nm. On the other hand, the upper limit of the arithmetic average particle diameter is preferably 55 nm, more preferably 50 nm, and still more preferably 45 nm. In the case where the arithmetic average particle diameter of the carbon black is less than the lower limit, there is a concern that the movement in the vertical direction of the pressure-sensitive adhesive sheet for covering after high-temperature treatment may increase. In the case where the arithmetic average particle diameter of the carbon black is more than the upper limit, there is a concern that the tensile elongation of the pressure-sensitive adhesive sheet for covering may decrease. Note that the arithmetic average particle diameter of the carbon black is determined in accordance with JIS-Z-8901 (2006). The same applies to the particle diameter of the inorganic filler and other particles which will be described below.

The lower limit of the specific surface area of the carbon black is preferably 30 $m^2/g$, more preferably 40 $m^2/g$, and still more preferably 45 $m^2/g$. On the other hand, the upper limit of the specific surface area is preferably 1,000 $m^2/g$. By setting the specific surface area of the carbon black to be in the range described above, the pressure-sensitive adhesive sheet for covering has moderate viscosity, and it is possible to suppress sagging of the pressure-sensitive adhesive sheet for covering at high temperatures. Note that the specific surface area of the carbon black is determined in accordance with JIS-Z-8830 (2013). The same applies to the specific surface area of the inorganic filler and other particles which will be described below.

(Inorganic Filler Other than Carbon Black)

An inorganic filler other than the carbon black, which is added to the pressure-sensitive adhesive sheet for covering to adjust the hardness, hand feeling, and the like of the pressure-sensitive adhesive sheet for covering, is an optional component. By incorporating the inorganic filler into the pressure-sensitive adhesive sheet for covering, the slippage suppression effect of the pressure-sensitive adhesive sheet for covering at high temperatures can be promoted, and it is possible to easily make fine adjustments to the hardness and hand feeling of the pressure-sensitive adhesive sheet for covering. Furthermore, by using, as the inorganic filler, a non-conductive inorganic filler, the electrical conductivity of the pressure-sensitive adhesive sheet for covering can be decreased. Furthermore, by adding the inorganic filler to the pressure-sensitive adhesive sheet for covering, it is possible to reduce the amounts used of the non-crosslinked rubber component and the oil component which are more expensive, and cost reduction can be achieved.

Examples of the inorganic filler include calcium carbonate, talc, clay, aluminum hydroxide, magnesium hydroxide, and the like. As the inorganic filler, calcium carbonate and talc are preferable, and calcium carbonate is more preferable. Since calcium carbonate and talc are inexpensive, it is possible to reduce material costs of the pressure-sensitive adhesive sheet for covering. Furthermore, in many cases, the inorganic filler other than the carbon black does not exhibit thixotropic properties. As described above, although silica exhibits thixotropic properties, there is a possibility that appropriate tensile strength and tensile elongation cannot be obtained. Therefore, it is necessary to add carbon black together with the inorganic filler.

The content of the inorganic filler relative to 100 parts by mass of the total of the non-crosslinked rubber component and the oil component is preferably more than 0 parts by mass. The lower limit of the content is more preferably 30 parts by mass, and still more preferably 60 parts by mass. The upper limit of the content is preferably 200 parts by mass, more preferably 170 parts by mass, and still more preferably 140 parts by mass. In the case where the content is more than the upper limit, there is a concern that the tensile strength of the pressure-sensitive adhesive sheet for covering may relatively increase and tensile elongation may decrease.

The lower limit of the arithmetic average particle diameter of the inorganic filler is preferably 50 nm, more preferably 100 nm, and still more preferably 150 nm. On the other hand, the upper limit of the arithmetic average particle diameter is preferably 10.0 μm, more preferably 7.0 μm, and still more preferably 5.0 By setting the arithmetic average particle diameter of the inorganic filler to be in the range described above, the pressure-sensitive adhesive sheet for covering has relatively low tensile strength and relatively large tensile elongation.

The lower limit of the specific surface area of the inorganic filler is preferably 0.10 m$^2$/g, more preferably 1.0 m$^2$/g, and still more preferably 2.0 m$^2$/g. On the other hand, the upper limit of the specific surface area is preferably 200 m$^2$/g, more preferably 100 m$^2$/g, and still more preferably 50 m$^2$/g. By setting the specific surface area of the inorganic filler to be in the range described above, the pressure-sensitive adhesive sheet for covering has relatively low tensile strength and relatively large tensile elongation.

(Tackifier)

A tackifier, which is added to the pressure-sensitive adhesive sheet for covering to improve the adhesiveness of the pressure-sensitive adhesive sheet for covering, is an optional component. By incorporating the tackifier into the pressure-sensitive adhesive sheet for covering, the pressure-sensitive adhesive sheet for covering is made to easily cover the adherend.

Any tackifier can be used as long as it is compatible with the non-crosslinked rubber component, and examples thereof include olefin resins, phenolic resins, rosin resins, terpene resins, and the like. As the tackifier, a terpene resin and a rosin resin are preferable, and a terpene resin is particularly preferable. A terpene resin is highly compatible with the non-crosslinked rubber component, and by using a terpene resin as the tackifier, the adhesiveness of the pressure-sensitive adhesive sheet for covering can be improved.

The content of the tackifier relative to 100 parts by mass of the total of the non-crosslinked rubber component and the oil component is preferably more than 0 parts by mass. The lower limit of the content is more preferably 4 parts by mass, and still more preferably 8 parts by mass. On the other hand, the upper limit of the content is preferably 30 parts by mass, more preferably 25 parts by mass, and still more preferably 20 parts by mass. In the case where the content is more than the upper limit, there is a concern that the tensile elongation of the pressure-sensitive adhesive sheet for covering may be decreased.

The lower limit of the molecular weight of the tackifier is preferably 100, more preferably 150, and still more preferably 200. On the other hand, the upper limit of the molecular weight is preferably 1,300, more preferably 1,000, and still more preferably 800. By setting the molecular weight of the tackifier to be in the range described above, the compatibility of the tackifier with the non-crosslinked rubber component is improved, and the adhesiveness of the pressure-sensitive adhesive sheet for covering can be improved.

The lower limit of the softening point of the tackifier is preferably 50° C., more preferably 55° C., and still more preferably 60° C. On the other hand, the upper limit of the softening point is preferably 150° C., more preferably 145° C., and still more preferably 140° C. By setting the softening point of the tackifier to be in the range described above, the compatibility of the tackifier with the non-crosslinked rubber component is improved, and the adhesiveness of the pressure-sensitive adhesive sheet for covering can be improved.

(Other Components)

The pressure-sensitive adhesive sheet for covering may include components other than the components described above. Examples of such components include a plasticizer, an antioxidant, a blowing agent, a blowing aid, a coloring agent, a dispersant, a flame retardant, and the like.

[Properties of Pressure-Sensitive Adhesive Sheet for Covering]

(Average Thickness)

The lower limit of the average thickness of the pressure-sensitive adhesive sheet for covering is preferably 0.20 mm, more preferably 0.40 mm, and still more preferably 0.60 mm. On the other hand, the upper limit of the average thickness is preferably 3.0 mm, more preferably 2.0 mm, and still more preferably 1.5 mm. In the case where the average thickness is less than the lower limit, there is a concern that breakage of the pressure-sensitive adhesive sheet for covering may occur, resulting in a decrease in operational efficiency. On the other hand, in the case where the average thickness is more than the upper limit, there is a concern that the operation of wrapping the pressure-sensitive adhesive sheet for covering may become difficult, resulting in a decrease in operational efficiency. Here, the average thickness is obtained by measuring the thickness at at least 10 points on the pressure-sensitive adhesive sheet for covering and averaging the measured values.

(Tensile Strength)

The tensile strength of the pressure-sensitive adhesive sheet for covering is preferably 0.5 MPa or less. The lower limit of the tensile strength of the pressure-sensitive adhesive sheet for covering is not particularly specified, but is preferably 0.05 MPa, more preferably 0.10 MPa, and still more preferably 0.15 MPa. On the other hand, the upper limit of the tensile strength is more preferably 0.45 MPa, and still more preferably 0.40 MPa. In the case where the tensile strength of the pressure-sensitive adhesive sheet for covering is less than the lower limit, there is a concern that the pressure-sensitive adhesive sheet for covering may be too soft, resulting in breakage. On the other hand, in the case where the tensile strength of the pressure-sensitive adhesive sheet for covering is more than the upper limit, there is a concern that the pressure-sensitive adhesive sheet for covering may become unlikely to be elongated. By setting the tensile strength of the pressure-sensitive adhesive sheet for covering to be in the range described above, breakage of the pressure-sensitive adhesive sheet for covering is suppressed, and the workload of the operator who uses this can be relieved, resulting in marked improvement in operational efficiency. Note that the tensile strength of the pressure-sensitive adhesive sheet for covering is obtained, in accordance with JIS-K-6251 (2010), by pulling an end of the pressure-sensitive adhesive sheet for covering with an average thickness of 1 mm at a pulling rate of 1,000 mm/min and measuring the force required to do so.

(Tensile Elongation)

The tensile elongation of the pressure-sensitive adhesive sheet for covering is preferably 2,000% or more. The lower limit of the tensile elongation of the pressure-sensitive adhesive sheet for covering is more preferably 3,000%, and still more preferably 4,000%. On the other hand, the upper limit of the tensile elongation is not particularly limited, but is preferably 8,000%, and more preferably 7,000%, and still more preferably 6,000%. In the case where the tensile elongation of the pressure-sensitive adhesive sheet for covering is less than the lower limit, there is a concern that the workload of the user who uses the pressure-sensitive adhesive sheet for covering may increase, resulting in a marked decrease in operational efficiency. On the other hand, in the case where the tensile elongation of the pressure-sensitive adhesive sheet for covering is more than the upper limit, there is a concern that the pressure-sensitive adhesive sheet for covering may be excessively elongated, resulting in a decrease in operational efficiency. Note that the tensile elongation of the pressure-sensitive adhesive sheet for covering is obtained, in accordance with JIS-K-6251 (2010), by pulling an end of the pressure-sensitive adhesive sheet for covering with an average thickness of 1 mm at a pulling rate of 1,000 mm/min and measuring the extent to which the pressure-sensitive adhesive sheet for covering stretches relative to the original natural length.

(Movement in the Vertical Direction)

The movement in the vertical direction of the pressure-sensitive adhesive sheet for covering is preferably 1 mm or less. The lower limit of the movement in the vertical direction of the pressure-sensitive adhesive sheet for covering is 0 mm. The upper limit of the movement in the vertical direction of the pressure-sensitive adhesive sheet for covering is more preferably 0.5 mm, and still more preferably 0.1 mm. By setting the movement in the vertical direction of the pressure-sensitive adhesive sheet for covering to be in the range described above, it becomes possible for the pressure-sensitive adhesive sheet for covering to continue to protect an adherend. The movement in the vertical direction refers to the distance over which the pressure-sensitive adhesive sheet for covering is moved vertically downward by gravity in the case where a flat surface or curved surface of an adherend to be covered with the pressure-sensitive adhesive sheet for covering is placed parallel to gravity, and the pressure-sensitive adhesive sheet for covering is attached to the flat surface or curved surface and left to stand at a high temperature of 130° C. or higher for a predetermined period of time (7 days).

(Peel Strength)

The peel strength of the pressure-sensitive adhesive sheet for covering is preferably 10 mN/mm$^2$ or more. The lower limit of the peel strength of the pressure-sensitive adhesive sheet for covering is more preferably 15 mN/mm$^2$, and still more preferably 20 mN/mm$^2$. On the other hand, the upper limit of the peel strength is not particularly limited, but is preferably 50 mN/mm$^2$, more preferably 45 mN/mm$^2$, and still more preferably 40 mN/mm$^2$. By setting the peel strength of the pressure-sensitive adhesive sheet for covering to be in the range described above, it is possible to suppress peeling of the pressure-sensitive adhesive sheet for covering from the adherend. Note that the peel strength is obtained in accordance with JIS-K-6854-2 (1999).

[Method for Producing Pressure-Sensitive Adhesive Sheet for Covering]

The pressure-sensitive adhesive sheet for covering can be obtained by a production method including the following steps:

(1) a step of kneading a non-crosslinked rubber component, an oil component, and carbon black together with an inorganic filler and a tackifier which are optional components by using a kneading machine (kneading step); and (2) a step of forming the kneaded mixture obtained in the kneading step into a desired shape by extrusion from an extruder (forming step).

In accordance with the method for producing the pressure-sensitive adhesive sheet for covering, by mixing the non-crosslinked rubber component, the oil component which softens the non-crosslinked rubber component, and carbon black, it is possible to easily and reliably obtain a pressure-sensitive adhesive sheet for covering in which tensile strength is relatively low, tensile elongation is relatively large, slippage and deterioration due to high temperature can be suppressed, and excellent adhesiveness is exhibited.

(1) Kneading Step

In this step, a non-crosslinked rubber component, an oil component, carbon black, an inorganic filler other than carbon black, and a tackifier are fed into a kneading machine, and kneading is performed by using the kneading machine.

As the kneading machine, a known kneading machine can be used, and examples thereof include a pressure kneader, an open kneader, a roll kneader, and the like. As the kneading machine, a pressure kneader and an open kneader are preferable, and a pressure kneader is particularly preferable. Since the pressure kneader kneads the adherend while applying a pressure thereto, the dispersibility of the kneaded mixture obtained by kneading is relatively high.

(2) Forming Step

In this step, the kneaded mixture obtained in the kneading step is introduced into an extruder and extruded from the extruder into a desired shape.

As the extruder, a known extruder can be used, and examples thereof include a single-screw extruder, a twin-screw extruder, a multi-screw extruder, and the like. As the extruder, a single-screw extruder and a twin-screw extruder are preferable, and a single-screw extruder is more preferable.

Other Embodiments

It should be considered that the embodiment disclosed this time is illustrative and non-restrictive in all aspects. The scope of the present invention is not limited to the embodiment described above but is defined by the appended claims, and is intended to include all modifications within the meaning and scope equivalent to those of the claims.

EXAMPLES

The present invention will be described more specifically below with reference to examples. However, it is to be understood that the present invention is not limited to the examples below.

[Production of Pressure-Sensitive Adhesive Sheet for Covering]

Example 1

As shown in Table 1, as a non-crosslinked rubber component, EPR (rubber component 1) having a molecular weight maximum peak of 100,000 and a density of 0.88 g/mL was prepared. Furthermore, as an oil component, polybutene (oil component 1) having a molecular weight maximum peak of 3,200 and a density of 0.898 g/mL was prepared. Furthermore, as carbon black, furnace black having an arithmetic average particle diameter of 38 nm and a specific surface area determined by nitrogen adsorption of 49 m$^2$/g was prepared. As shown in Table 2, the content of the rubber component 1 was 40% by mass, the content of the oil component 1 was 60% by mass, and the content of carbon black relative to 100 parts by mass of the total of the rubber component 1 and the oil component 1 was 10 parts by mass. By mixing these materials with a pressure kneader/open kneader, a kneaded mixture was produced. The kneaded mixture was extruded from an extruder to form a tapeshaped pressure-sensitive adhesive sheet for covering with an extrusion thickness of 1 mm, a width of 10 mm, and a length of 50 mm.

Example 2

As shown in Table 1, in Example 2, as a non-crosslinked rubber component, butyl rubber (rubber component 2) having a molecular weight maximum peak of 600,000 and a density of 0.92 g/mL was used. As shown in Table 2, in Example 2, except that the rubber component 2 was used instead of the rubber component 1, a pressure-sensitive adhesive sheet for covering was produced as in Example 1.

Example 3

As shown in Table 1, in Example 3, as a non-crosslinked rubber component, butyl rubber (rubber component 3) having a molecular weight maximum peak of 400,000 and a density of 0.92 g/mL was used. As shown in Table 2, in Example 3, except that the rubber component 3 was used instead of the rubber component 2, a pressure-sensitive adhesive sheet for covering was produced as in Example 2.

Example 4

As shown in Table 1, in Example 4, as a non-crosslinked rubber component, polyisobutylene (rubber component 4) having a molecular weight maximum peak of 2,600,000 and a density of 0.92 g/mL was used. As shown in Table 2, in Example 4, except that the rubber component 4 was used instead of the rubber component 2, a pressure-sensitive adhesive sheet for covering was produced as in Example 2.

Example 5

As shown in Table 1, in Example 5, as a non-crosslinked rubber component, polyisobutylene (rubber component 5) having a molecular weight maximum peak of 200,000 and a density of 0.92 g/mL was used. As shown in Table 2, in Example 5, except that the rubber component 5 was used instead of the rubber component 2, a pressure-sensitive adhesive sheet for covering was produced as in Example 2.

Example 6

As shown in Table 1, in Example 6, as a non-crosslinked rubber component, polyisobutylene (rubber component 6) having a molecular weight maximum peak of 50,000 and a density of 0.92 g/mL was used. As shown in Table 2, in Example 6, except that the rubber component 6 was used instead of the rubber component 2, a pressure-sensitive adhesive sheet for covering was produced as in Example 2.

Example 7

As shown in Table 1, in Example 7, as an oil component, polybutene (oil component 2) having a molecular weight maximum peak of 9,000 and a density of 0.910 g/mL was used. As shown in Table 2, in Example 7, except that the oil component 2 was used instead of the oil component 1, a pressure-sensitive adhesive sheet for covering was produced as in Example 2.

Example 8

As shown in Table 2, in Example 8, except that the rubber component 5 was used instead of the rubber component 2, a pressure-sensitive adhesive sheet for covering was produced as in Example 7.

Example 9

As shown in Table 1, in Example 9, as an oil component, paraffin-based mineral oil (oil component 3) having a molecular weight maximum peak of 1,600 and a density of 0.913 g/mL was used. As shown in Table 2, in Example 9, except that the oil component 3 was used instead of the oil component 2, a pressure-sensitive adhesive sheet for covering was produced as in Example 7.

Example 10

As shown in Table 2, in Example 10, except that the content of carbon black relative to 100 parts by mass of the total of the non-crosslinked rubber component and the oil component was changed from 10 parts by mass to 40 parts by mass, a pressure-sensitive adhesive sheet for covering was produced as in Example 2.

Example 11

As shown in Table 2, in Example 11, except that the content of carbon black relative to 100 parts by mass of the total of the non-crosslinked rubber component and the oil component was changed from 10 parts by mass to 1 part by mass, a pressure-sensitive adhesive sheet for covering was produced as in Example 2.

Example 12

As shown in Table 1, in Example 12, as an inorganic filler, talc (inorganic filler 1) having a BET specific surface area of 10.5 m²/g and an average particle diameter of 4,000 nm was used. As shown in Table 2, in Example 12, except that 50 parts by mass of the inorganic filler 1 relative to 100 parts by mass of the total of the non-crosslinked rubber component and the oil component was further added, a pressure-sensitive adhesive sheet for covering was produced as in Example 2.

Example 13

As shown in Table 2, in Example 13, except that the content of the inorganic filler 1 was changed from 50 parts by mass to 200 parts by mass, a pressure-sensitive adhesive sheet for covering was produced as in Example 12.

Example 14

As shown in Table 1, in Example 14, as an inorganic filler, calcium carbonate (inorganic filler 2) having a BET specific surface area of 11.5 m²/g and an average particle diameter of 200 nm was used. As shown in Table 3, except that the inorganic filler 2 was used instead of the inorganic filler 1, a pressure-sensitive adhesive sheet for covering was produced as in Example 12.

Example 15

As shown in Table 1, in Example 15, as a tackifier, a terpene resin (tackifier 1) having a softening point of 80° C.

and a molecular weight of 700 was used. As shown in Table 3, in Example 15, except that 10 parts by mass of the tackifier 1 relative to 100 parts by mass of the total of the non-crosslinked rubber component and the oil component was further added, a pressure-sensitive adhesive sheet for covering was produced as in Example 2.

Example 16

As shown in Table 1, in Example 16, as a tackifier, a terpene resin (tackifier 2) having a softening point of 125° C. and a molecular weight of 700 was used. As shown in Table 3, in Example 16, except that the tackifier 2 was used instead of the tackifier 1, a pressure-sensitive adhesive sheet for covering was produced as in Example 15.

Comparative Example 1

As shown in Table 3, in Comparative Example 1, except that the content of the rubber component 2 was set to be 20% by mass and the content of the oil component 1 was set to be 80% by mass, a pressure-sensitive adhesive sheet for covering was produced as in Example 2.

Comparative Example 2

As shown in Table 3, in Comparative Example 2, except that the content of the rubber component 2 was set to be 70% by mass and the content of the oil component 1 was set to be 30% by mass, a pressure-sensitive adhesive sheet for covering was produced as in Example 2.

Comparative Example 3

As shown in Table 1, in Comparative Example 3, as a non-crosslinked rubber component, polyisobutylene (rubber component 7) having a molecular weight maximum peak of 30,000 and a density of 0.92 g/mL was used. As shown in Table 3, in Comparative Example 3, except that the rubber component 7 was used instead of the rubber component 2, a pressure-sensitive adhesive sheet for covering was produced as in Example 2.

Comparative Example 4

As shown in Table 1, in Comparative Example 4, as an oil component, paraffin-based mineral oil (oil component 4) having a molecular weight maximum peak of 150 and a density of 0.882 g/mL was used. As shown in Table 3, in Comparative Example 4, except that the oil component 4 was used instead of the oil component 1, a pressure-sensitive adhesive sheet for covering was produced as in Example 2.

Comparative Example 5

As shown in Table 3, in Comparative Example 5, except that carbon black was not used, a pressure-sensitive adhesive sheet for covering was produced as in Example 2.

Comparative Example 6

As shown in Table 3, in Comparative Example 6, except that the content of carbon back relative to 100 parts by mass of the total of the non-crosslinked rubber component and the oil component was changed from 10 parts by mass to 50 parts by mass, a pressure-sensitive adhesive sheet for covering was produced as in Example 2.

Comparative Example 7

As shown in Table 3, in Comparative Example 7, except that carbon black was not used, a pressure-sensitive adhesive sheet for covering was produced as in Example 13.

Comparative Example 8

As shown in Table 1, in Comparative Example 8, as a non-crosslinked rubber component, polyisobutylene (rubber component 8) having a molecular weight maximum peak of 4,000,000 and a density of 0.92 g/mL was used. As shown in Table 3, in Comparative Example 8, except that the rubber component 8 was used instead of the rubber component 2, a pressure-sensitive adhesive sheet for covering was produced as in Example 2.

Comparative Example 9

As shown in Table 3, in Comparative Example 9, except that the content of the rubber component 8 was changed from 40% by mass to 10% by mass and the content of the oil component 1 was changed from 60% by mass to 90% by mass, a pressure-sensitive adhesive sheet for covering was produced as in Comparative Example 8.

Comparative Example 10

As shown in Table 1, in Comparative Example 10, as an oil component, polyisobutylene oil (oil component 5) having a molecular weight maximum peak of 25,000 and a density of 0.92 g/mL was used. As shown in Table 3, in Comparative Example 10, except that the oil component 5 was used instead of the oil component 1, a pressure-sensitive adhesive sheet for covering was produced as in Example 2.

TABLE 1

| | Material | Molecular weight maximum peak — | Density (g/mL) | Average particle diameter (nm) | Specific surface area ($m^2$/g) | Softening point (° C.) | Molecular weight — |
|---|---|---|---|---|---|---|---|
| Rubber component 1 | EPR | 100,000 | 0.88 | — | — | — | — |
| Rubber component 2 | Butyl rubber | 600,000 | 0.92 | — | — | — | — |
| Rubber component 3 | Butyl rubber | 400,000 | 0.92 | — | — | — | — |
| Rubber component 4 | Polyisobutylene | 2,600,000 | 0.92 | — | — | — | — |
| Rubber component 5 | Polyisobutylene | 200,000 | 0.92 | — | — | — | — |
| Rubber component 6 | Polyisobutylene | 50,000 | 0.92 | — | — | — | — |
| Rubber component 7 | Polyisobutylene | 30,000 | 0.92 | — | — | — | — |
| Rubber component 8 | Polyisobutylene | 4,000,000 | 0.92 | — | — | — | — |
| Oil component 1 | Polybutene | 3,200 | 0.898 | — | — | — | — |

TABLE 1-continued

| | Material | Molecular weight maximum peak — | Density (g/mL) | Average particle diameter (nm) | Specific surface area (m$^2$/g) | Softening point (° C.) | Molecular weight — |
|---|---|---|---|---|---|---|---|
| Oil component 2 | Polybutene | 9,000 | 0.910 | — | — | — | — |
| Oil component 3 | Paraffin-based mineral oil | 1,600 | 0.913 | — | — | — | — |
| Oil component 4 | Paraffin-based mineral oil | 150 | 0.882 | — | — | — | — |
| Oil component 5 | Polyisobutylene oil | 25,000 | 0.92 | — | — | — | — |
| Carbon black | Furnace black | — | — | 38 | 49 | — | — |
| Inorganic filler 1 | Talc | — | — | 4,000 | 10.5 | — | — |
| Inorganic filler 2 | Calcium carbonate | — | — | 200 | 11.5 | — | — |
| Tackifier 1 | Terpene resin | — | — | — | — | 80 | 700 |
| Tackifier 2 | Terpene resin | — | — | — | — | 125 | 700 |

TABLE 2

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Rubber component 1 (mass %) | 40 | — | — | — | — | — | — | — | — | — | — | — | — |
| Rubber component 2 (mass %) | — | 40 | — | — | — | — | 40 | — | 40 | 40 | 40 | 40 | 40 |
| Rubber component 3 (mass %) | — | — | 40 | — | — | — | — | — | — | — | — | — | — |
| Rubber component 4 (mass %) | — | — | — | 40 | — | — | — | — | — | — | — | — | — |
| Rubber component 5 (mass %) | — | — | — | — | 40 | — | — | 40 | — | — | — | — | — |
| Rubber component 6 (mass %) | — | — | — | — | — | 40 | — | — | — | — | — | — | — |
| Rubber component 7 (mass %) | — | — | — | — | — | — | — | — | — | — | — | — | — |
| Rubber component 8 (mass %) | — | — | — | — | — | — | — | — | — | — | — | — | — |
| Oil component 1 (mass %) | 60 | 60 | 60 | 60 | 60 | 60 | — | — | — | 60 | 60 | 60 | 60 |
| Oil component 2 (mass %) | — | — | — | — | — | — | 60 | 60 | — | — | — | — | — |
| Oil component 3 (mass %) | — | — | — | — | — | — | — | — | 60 | — | — | — | — |
| Oil component 4 (mass %) | — | — | — | — | — | — | — | — | — | — | — | — | — |
| Oil component 5 (mass %) | — | — | — | — | — | — | — | — | — | — | — | — | — |
| Carbon black (parts by mass**) | 10 | 10 | 10 | 10 | 10 | 10 | 10 | 10 | 10 | 40 | 1 | 10 | 10 |
| Inorganic filler 1 (parts by mass**) | — | — | — | — | — | — | — | — | — | — | — | 50 | 200 |
| Inorganic filler 2 (parts by mass**) | — | — | — | — | — | — | — | — | — | — | — | — | — |
| Tackifier 1 (parts by mass**) | — | — | — | — | — | — | — | — | — | — | — | — | — |
| Tackifier 2 (parts by mass**) | — | — | — | — | — | — | — | — | — | — | — | — | — |

**The content relative to 100 parts by mass of the total of the rubber component and the oil component is stated in parts by mass.

TABLE 3

| | Example | | | Comparative Example | | | | | | | | | |
|---|---|---|---|---|---|---|---|---|---|---|---|---|---|
| | 14 | 15 | 16 | 1 | 2 | 3 | 4 | 5 | 6 | 7 | 8 | 9 | 10 |
| Rubber component 1 (mass %) | — | — | — | — | — | — | — | — | — | — | — | — | — |
| Rubber component 2 (mass %) | 40 | 40 | 40 | 20 | 70 | — | 40 | 40 | 40 | 40 | — | — | 40 |
| Rubber component 3 (mass %) | — | — | — | — | — | — | — | — | — | — | — | — | — |
| Rubber component 4 (mass %) | — | — | — | — | — | — | — | — | — | — | — | — | — |
| Rubber component 5 (mass %) | — | — | — | — | — | — | — | — | — | — | — | — | — |
| Rubber component 6 (mass %) | — | — | — | — | — | — | — | — | — | — | — | — | — |
| Rubber component 7 (mass %) | — | — | — | — | — | 40 | — | — | — | — | — | — | — |
| Rubber component 8 (mass %) | — | — | — | — | — | — | — | — | — | — | 40 | 10 | — |
| Oil component 1 (mass %) | 60 | 60 | 60 | 80 | 30 | 60 | — | 60 | 60 | 60 | 60 | 90 | — |
| Oil component 2 (mass %) | — | — | — | — | — | — | — | — | — | — | — | — | — |
| Oil component 3 (mass %) | — | — | — | — | — | — | — | — | — | — | — | — | — |
| Oil component 4 (mass %) | — | — | — | — | — | — | 60 | — | — | — | — | — | — |
| Oil component 5 (mass %) | — | — | — | — | — | — | — | — | — | — | — | — | 60 |
| Carbon black (parts by mass**) | 10 | 10 | 10 | 10 | 10 | 10 | 10 | — | 50 | — | 10 | 10 | 10 |
| Inorganic filler 1 (parts by mass**) | — | — | — | — | — | — | — | — | — | 200 | — | — | — |
| Inorganic filler 2 (parts by mass**) | 50 | — | — | — | — | — | — | — | — | — | — | — | — |
| Tackifier 1 (parts by mass**) | — | 10 | — | — | — | — | — | — | — | — | — | — | — |
| Tackifier 2 (parts by mass**) | — | — | 10 | — | — | — | — | — | — | — | — | — | — |

**The content relative to 100 parts by mass of the total of the rubber component and the oil component is stated in parts by mass.

[Tensile Strength]

The tensile strength was measured on the pressure-sensitive adhesive sheets for covering of Examples 1 to 16 and Comparative Examples 1 to 9 produced as described above. The tensile strength was calculated by a method in which one end of a pressure-sensitive adhesive sheet for covering was fixed, the other end was pulled at a rate of 1,000 mm/min, and the tensile strength against elongation was measured.

[Tensile Elongation]

A tensile elongation test was conducted on the pressure-sensitive adhesive sheets for covering. In the tensile elongation test, one end of a pressure-sensitive adhesive sheet for covering was fixed, the other end was pulled at a rate of 1,000 mm/min in the same manner as that described above, and the extent to which the other end moved from its original position in a direction opposite the one end was measured.

[Movement in the Vertical Direction]

The movement in the vertical direction was measured on the pressure-sensitive adhesive sheets for covering. Each of the pressure-sensitive adhesive sheets for covering was wrapped around a sample in which conductor portions of electrical wires were bound together, each conductor portion being obtained by removing a protective layer from an electrical wire having a conductor diameter of 0.8 mm and an outside diameter of the electrical wire including the protective layer of 1.6 mm. The sample was held such that its axis was parallel to the vertical direction and left to stand in the environment at 130° C. for 7 days. The distance over which the lower end of the pressure-sensitive adhesive sheet for covering moved was measured, and when the movement in the vertical direction was 1 mm or less, the sample was evaluated as passed.

[Peel Pattern and Peel Strength During Shear Peeling]

Each of the pressure-sensitive adhesive sheets for covering was sandwiched between two copper plates with a width of 10 mm, and by pressing the copper plates in the thickness direction, a sample for checking shear peeling was fabricated. A pressure of 1 MPa was applied to the copper plates for 5 seconds at room temperature (25° C.). One of the copper plates was fixed, and by pulling the other copper plate at a rate of 50 mm/min, the peel strength was checked. Furthermore, when such a peel test was conducted, the peel pattern at the interface between the adherend and the pressure-sensitive adhesive sheet for covering was observed. In Tables 4 to 6, "A" under the column of Peel pattern shows that cohesive failure occurred in the pressure-sensitive adhesive sheet for covering, and "B" shows that interfacial peeling of the pressure-sensitive adhesive sheet for covering from the adherend occurred. The term "cohesive failure" means that rupture occurs within the pressure-sensitive adhesive sheet for covering without peeling of the pressure-sensitive adhesive sheet for covering from the adherend at the interface between the pressure-sensitive adhesive sheet for covering and the adherend. Furthermore, the term "interfacial peeling" means that the pressure-sensitive adhesive sheet for covering peels off the adherend at the interface between the pressure-sensitive adhesive sheet for covering and the adherend without rupture within the pressure-sensitive adhesive sheet for covering. In the case of B (interfacial peeling), the adhesion force between the pressure-sensitive adhesive sheet for covering and the adherend is weak, and it is judged that the pressure-sensitive adhesive sheet for covering does not perform its function. On the other hand, in the case of A (cohesive failure), the adhesiveness between the pressure-sensitive adhesive sheet for covering and the adherend is sufficiently strong, and it is judged that the pressure-sensitive adhesive sheet for covering performs its function satisfactorily.

[Results]

Tables 4 to 6 show the tensile strength, tensile elongation, movement in the vertical direction, peel strength, and peel pattern. Note that "*" in Table 6 shows that separation of the rubber component from the oil component occurred.

TABLE 4

| | Example | | | | | | | |
|---|---|---|---|---|---|---|---|---|
| | 1 | 2 | 3 | 4 | 5 | 6 | 7 | 8 |
| Tensile strength (MPa) | 0.21 | 0.31 | 0.28 | 0.45 | 0.24 | 0.15 | 0.32 | 0.26 |
| Tensile elongation (%) | >5,000 | >5,000 | >5,000 | >5,000 | >5,000 | >5,000 | >5,000 | >5,000 |
| Movement in the vertical direction (mm) | 0 | 0 | 0 | 0 | 0 | 0.3 | 0 | 0 |
| Peel strength (mN/mm$^2$) | 110 | 70 | 80 | 40 | 90 | 130 | 60 | 70 |
| Peel pattern | A | A | A | A | A | A | A | A |

TABLE 5

| | Example | | | | | | | |
|---|---|---|---|---|---|---|---|---|
| | 9 | 10 | 11 | 12 | 13 | 14 | 15 | 16 |
| Tensile strength (MPa) | 0.28 | 0.47 | 0.26 | 0.36 | 0.48 | 0.33 | 0.32 | 0.31 |
| Tensile elongation (%) | >5,000 | >5,000 | >5,000 | >5,000 | >5,000 | >5,000 | >5,000 | >5,000 |
| Movement in the vertical direction (mm) | 0.1 | 0 | 0.2 | 0 | 0 | 0 | 0 | 0 |
| Peel strength (mN/mm$^2$) | 90 | 50 | 100 | 60 | 30 | 60 | 120 | 90 |
| Peel pattern | A | A | A | A | A | A | A | A |

TABLE 6

|  | Comparative Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Tensile strength (MPa) | 0.15 | 0.64 | 0.11 | 0.19 | 0.26 | 0.53 | 0.43 | 0.70 | 0.50 | 0.65 |
| Tensile elongation (%) | >5,000 | >5,000 | >5,000 | >5,000 | >5,000 | 1,600 | >5,000 | 1,800 | 3,500 | 1,600 |
| Movement in the vertical direction (mm) | 15 | 0 | 55 | 85* | 2.5 | 0 | 1.8 | 0 | 6 | 0 |
| Peel strength (mN/mm$^2$) | 5 | 20 | 5 | 5 | 50 | 40 | 30 | 5 | 15 | 5 |
| Peel pattern | A | B | A | A | A | B | A | B | A | B |

[Evaluation]

(Difference in adhesion of pressure-sensitive adhesive sheets for covering due to difference in molecular weight at maximum peak position of non-crosslinked rubber components) Examples 1 to 6 and Comparative Examples 3 and 8 are common in that the content of the rubber component is 40% by mass, the content of the oil component is 60% by mass, the maximum peak in the molecular weight distribution of the oil component is 3,200, and the content of carbon black relative to 100 parts by mass of the total of the rubber component and the oil component is 10 parts by mass, but are different in the maximum peak in the molecular weight distribution of the rubber component. In the case of Comparative Example 3 in which the maximum peak is at a molecular weight of 30,000, the movement in the vertical direction was 55 mm, while in Example 1 in which the maximum peak is at a molecular weight of 100,000, in Example 2 in which the maximum peak is at a molecular weight of 600,000, in Example 3 in which the maximum peak is at a molecular weight of 400,000, in Example 4 in which the maximum peak is at a molecular weight of 2,600,000, in Example 5 in which the maximum peak is at a molecular weight of 200,000, and in Example 6 in which the maximum peak is at a molecular weight of 50,000, the movement in the vertical direction was 0 mm, 0 mm, 0 mm, 0 mm, 0 mm, and 0.3 mm, respectively. In the case where the maximum peak in the molecular weight distribution of the non-crosslinked rubber component is at a molecular weight of 50,000 or more, the movement in the vertical direction was extremely small, and adhesion of the pressure-sensitive adhesive sheet for covering was very high. In contrast, in the case where the maximum peak is at a molecular weight of less than 50,000, for example, at a molecular weight of 30,000, the movement in the vertical direction of the pressure-sensitive adhesive sheet for covering was extremely large, and the adhesion of pressure-sensitive adhesive sheet for covering was very low. From the above it is obvious that when the maximum peak in the molecular weight distribution of the non-crosslinked rubber component is in the range of 50,000 or more, the adhesion of the pressure-sensitive adhesive sheet for covering is very high.

Furthermore, in the case of Comparative Example 8, the tensile strength was 0.70 MPa, while in Examples 1 to 6, the tensile strength was 0.21 MPa, 0.31 MPa, 0.28 MPa, 0.45 MPa, 0.24 MPa, and 0.15 MPa, respectively. From this it is obvious that when the maximum peak in the molecular weight distribution of the non-crosslinked rubber component is in the range of 3,000,000 or less, the tensile strength of the pressure-sensitive adhesive sheet for covering is very low. Furthermore, in the case of Comparative Example 8, the tensile elongation was 1,800%, while in Examples 1 to 6, the tensile elongation was 5,000% or more. From this it is obvious that when the maximum peak in the molecular weight distribution of the non-crosslinked rubber component is in the range of 3,000,000 or less, the tensile elongation of the pressure-sensitive adhesive sheet for covering is very large.

(Difference in Adhesion of Pressure-Sensitive Adhesive Sheets for Covering Due to Difference in Molecular Weight at Maximum Peak Position of Oil Components)

Examples 2, 7, and 9 and Comparative Examples 4 and 10 are common in that the content of the non-crosslinked rubber component is 40% by mass, the maximum peak in the molecular weight distribution of the non-crosslinked rubber component is 600,000, the content of the oil component is 60% by mass, and the content of carbon black relative to 100 parts by mass of the total of the rubber component and the oil component is 10 parts by mass, but are different in the maximum peak in the molecular weight distribution of the oil component. In the case of Comparative Example 4 in which the maximum peak in the molecular weight distribution of the oil component is at a molecular weight of 150, the movement in the vertical direction was 85 mm, while in Example 2 in which the maximum peak is at a molecular weight of 3,200, in Example 7 in which the maximum peak is at a molecular weight of 9,000, and in Example 9 in which the maximum peak is at a molecular weight of 1,600, the movement in the vertical direction was 0 mm, 0 mm, and 0.1 mm, respectively. In the case where the maximum peak in the molecular weight distribution of the oil component is at a molecular weight of 1,000 or more, the movement in the vertical direction was extremely small, and the adhesion of the pressure-sensitive adhesive sheet for covering was very high. In contrast, in the case where the maximum peak is at a molecular weight of less than 1,000, for example, at a molecular weight of 150, the movement in the vertical direction of the pressure-sensitive adhesive sheet for covering was extremely large, and the adhesion of the pressure-sensitive adhesive sheet for covering was very low. Furthermore, in this case, the oil component and the non-crosslinked rubber component were separated from each other in the pressure-sensitive adhesive sheet for covering, and the pressure-sensitive adhesive sheet for covering did not perform its function. From the above it is obvious that when the maximum peak in the molecular weight distribution of the oil component is in the range of 1,000 or more, the adhesion of the pressure-sensitive adhesive sheet for covering is very high, and it is possible to suppress separation of the non-crosslinked rubber component from the oil component in the pressure-sensitive adhesive sheet for covering even in a high-temperature environment.

Furthermore, in the case of Comparative Example 10, the tensile strength was 0.65 MPa, while in the case of Examples 2, 7, and 9, the tensile strength was 0.31 MPa, 0.32 MPa, and 0.28 MPa, respectively. From this it is obvious that when the maximum peak in the molecular weight distribution of the oil component is in the range of 20,000 or less, the tensile strength of the pressure-sensitive adhesive sheet for covering is very low. Furthermore, in the case of Comparative Example 10, the tensile elongation was 1,600%, while in the case of Examples 2, 7, and 9, the tensile elongation was 5,000% or more. From this it is obvious that when the maximum peak in the molecular weight distribution of the oil component is in the range of 20,000 or less, the tensile elongation of the pressure-sensitive adhesive sheet for covering is very large.

(Difference in Properties Due to Difference in Contents of Non-Crosslinked Rubber Component and Oil Component)

Example 2 and Comparative Example 1 are common in that the non-crosslinked rubber component is the rubber component 2, the oil component is the oil component 1, and the content of carbon black relative to 100 parts by mass of the total of the rubber component and the oil component is 10 parts by mass, but are different in the contents of the non-crosslinked rubber component and the oil component. In Comparative Example 1 in which the content of the non-crosslinked rubber component is 20% by mass and the content of the oil component is 80% by mass, the movement in the vertical direction was 15 mm, while in Example 2 in which the content of the non-crosslinked rubber component is 40% by mass and the content of the oil component is 60% by mass, the movement in the vertical direction was 0 mm. In the case where the content of the non-crosslinked rubber component is less than 25% by mass, i.e., the content of the oil component is more than 75% by mass, the movement in the vertical direction of the pressure-sensitive adhesive sheet for covering was extremely large, while in the case where the content of the non-crosslinked rubber component is 25% by mass or more, i.e., the content of the oil component is 75% by mass or less, the movement in the vertical direction was extremely small.

On the other hand, Example 2 and Comparative Example 2 are, as in the above, common in that the non-crosslinked rubber component is the rubber component 2, the oil component is the oil component 1, and the content of carbon black relative to 100 parts by mass of the total of the rubber component and the oil component is 10 parts by mass, but are different in the contents of the non-crosslinked rubber component and the oil component. In Comparative Example 2 in which the content of the non-crosslinked rubber component is 70% by mass and the content of the oil component is 30% by mass, the tensile strength was 0.64 MPa, while in Example 2 in which the content of the non-crosslinked rubber component is 40% by mass and the content of the oil component is 60% by mass, the tensile strength was 0.31 MPa. Furthermore, in Comparative Example 2, interfacial peeling occurred at the interface between the pressure-sensitive adhesive sheet for covering and the adherend, while in Example 2, instead of interfacial peeling, cohesive failure occurred in the pressure-sensitive adhesive sheet for covering. In the case where the content of the non-crosslinked rubber component is more than 65% by mass, i.e., the content of the oil component is less than 35% by mass, the tensile strength was relatively high, and interfacial peeling occurred, while in the case where the content of the non-crosslinked rubber component is 65% by mass or less, i.e., the content of the oil component is 35% by mass or more, the tensile strength is relatively low, and instead of interfacial peeling, cohesive failure occurred. From the above it is obvious that in the case where the content of the non-crosslinked rubber component is 25% to 65% by mass, i.e., the content of the oil component is 35% to 75% by mass, the movement in the vertical direction is very small, the tensile strength is relatively low, and interfacial peeling can be suppressed. Note that the total of the content of the non-crosslinked rubber component and the content of the oil component is 100% by mass.

(Difference in Properties Due to Difference in Content of Carbon Black)

Examples 2, 10, and 11 and Comparative Example 5 are common in that the content of the non-crosslinked rubber component is 40% by mass, the non-crosslinked rubber component is the rubber component 2, the content of the oil component is 60% by mass, and the oil component is the oil component 1, but are different in the content of carbon black relative to 100 parts by mass of the total of the non-crosslinked rubber component and the oil component. In Comparative Example 5 in which the content of carbon black is 0 parts by mass, the movement in the vertical direction was 2.5 mm, while in Examples 11, 2, and 10 in which the content is 1 part by mass, 10 parts by mass, and 40 parts by mass, respectively, the movement in the vertical direction was 0.2 mm, 0 mm, and 0 mm, respectively. In the case where the content of carbon black is less than 1% by mass, the movement in the vertical direction was relatively large, while in the case where the content of carbon black is 1% by mass or more, the movement in the vertical direction was relatively small. On the other hand, in Comparative Example 6 in which the content of carbon black relative to 100 parts by mass of the total of the non-crosslinked rubber component and the oil component is 50 parts by mass, the tensile strength was 0.53 MPa, and the tensile elongation was 1,600%, while in Examples 11, 2, and 10, the tensile strength was 0.26 MPa, 0.31 MPa, and 0.47 MPa, respectively, and the tensile elongation was 5,000% or more. From the above it is obvious that in the case where the content of carbon black relative to 100 parts by mass of the total of the non-crosslinked rubber component and the oil component is 1 to 40 parts by mass, the movement in the vertical direction is very small, and adhesion is relatively high. It is also obvious that, since the tensile strength is relatively low, interfacial peeling is unlikely to occur.

INDUSTRIAL APPLICABILITY

As described above, in a pressure-sensitive adhesive sheet for covering according to an embodiment of the present invention, tensile strength is relatively low, tensile elongation is relatively large, slippage and deterioration due to high temperature can be suppressed, and excellent adhesiveness is exhibited, and the operation of wrapping the pressure-sensitive adhesive sheet for covering can be performed easily. Accordingly, the pressure-sensitive adhesive sheet for covering can be suitably used to cover a bundled portion of electrical wires and the like.

The invention claimed is:

1. A pressure-sensitive adhesive sheet for covering comprising:
   a non-crosslinked rubber component having a maximum peak of the molecular weight distribution in the range of 50,000 to 3,000,000;
   an oil component having a maximum peak of the molecular weight distribution in the range of 1,000 to 20,000; and
   carbon black,
   wherein the content of the non-crosslinked rubber component is 25% to 50% by mass,
   the content of the oil component is 35% to 75% by mass,
   the content of the carbon black relative to 100 parts by mass of the total of the non-crosslinked rubber component and the oil component is 1 to 40 parts by mass, the non-crosslinked rubber component is selected from butyl rubber or polyisobutylene rubber, and
the oil component is polybutene.

2. The pressure-sensitive adhesive sheet for covering according to claim 1, further comprising an inorganic filler other than the carbon black,
wherein the content of the inorganic filler relative to 100 parts by mass of the total of the non-crosslinked rubber component and the oil component is more than 0 parts by mass and 200 parts by mass or less.

3. The pressure-sensitive adhesive sheet for covering according to claim 2, wherein the inorganic filler is at least one selected from the group consisting of calcium carbonate, talc, clay, aluminum hydroxide, and magnesium hydroxide.

4. The pressure-sensitive adhesive sheet for covering according to claim 1, further comprising a tackifier having a softening point of 50° C. to 150° C. and a molecular weight of 100 to 1,300,
wherein the content of the tackifier relative to 100 parts by mass of the total of the non-crosslinked rubber component and the oil component is more than 0 parts by mass and 30 parts by mass or less.

5. The pressure-sensitive adhesive sheet for covering according to claim 1, wherein the carbon black is at least one selected from the group consisting of furnace black, ketjen black, and acetylene black.

6. The pressure-sensitive adhesive sheet for covering according to claim 1, wherein the pressure-sensitive adhesive sheet has a tensile strength of 0.5 MPa or less and a tensile elongation of 2,000% or more, and
the movement in the vertical direction of the pressure-sensitive adhesive sheet for covering after being heated at 130° C. for 7 days on a surface parallel to gravity is 1 mm or less.

* * * * *